No. 861,585. PATENTED JULY 30, 1907.
W. H. GARDNER.
HORSE HITCHING DEVICE.
APPLICATION FILED MAY 29, 1906.
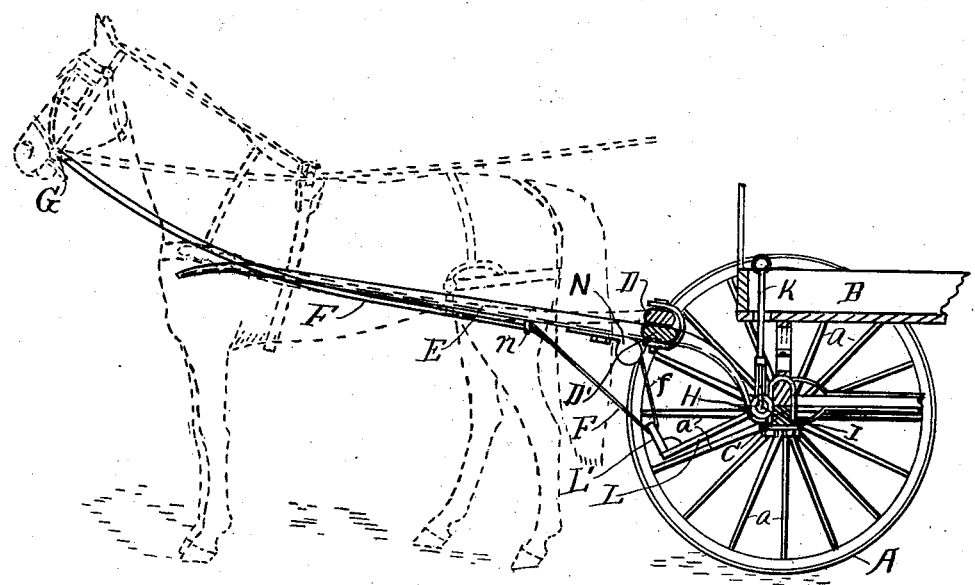
Fig. 1.
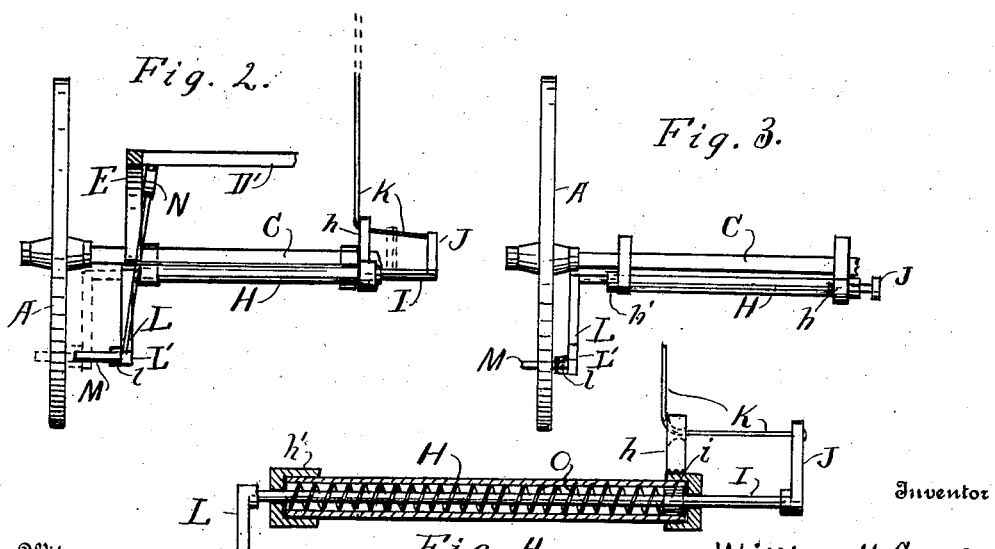
Witnesses
A. Allgier.
Carl C. Cilley.
Inventor
William H. Gardner
By
Letriel J. Cilley
Attorney

UNITED STATES PATENT OFFICE.

WILLIAM H. GARDNER, OF GRAND RAPIDS, MICHIGAN.

HORSE-HITCHING DEVICE.

No. 861,585.  Specification of Letters Patent.  Patented July 30, 1907.

Application filed May 29, 1906. Serial No. 319,382.

*To all whom it may concern:*

Be it known that I, WILLIAM H. GARDNER, a citizen of the United States, residing at Grand Rapids, in the county of Kent and State of Michigan, have invented certain new and useful Improvements in Horse-Hitching Devices, of which the following is a specification.

My invention relates to improvements in devices for securing horses when hitched to buggies, wagons &c. and its objects are: first, to provide a means attached to the axletree of the buggy whereby the horse may be secured by the action of the buggy wheel, and, second, to provide means for protecting the actuating springs &c., that actuate the securing device, from danger of being rendered useless by reason of being covered with mud during wet muddy roads. I attain these objects by the mechanism illustrated in the accompanying drawing in which Figure 1 is a sectional side elevation of a buggy with the horse shown in outline and with the securing device in place; Fig. 2 is a front elevation of one wheel and a portion of the axletree of a buggy showing the securing device in the place; Fig. 3 is a top plan of the same, and Fig. 4 is a longitudinal section of the protecting case showing how the actuating spring is protected.

Similar letters refer to similar parts throughout the several views.

A represents the buggy wheel; B represents the buggy box, and C represents the axletree. For my device I secure a protecting case H to the axletree C so that it is held firmly thereto, and provide a head and upwardly projecting arm h at one end and a cap or head h' at the other end, both of these heads being so formed as to provide a close but easily working bearing for the shaft or rod I. The rod I has an upwardly projecting arm J at one end, to which is attached a strap or chain K which passes from this arm through an aperture in the arm h, as indicated in Figs. 2 and 4, and up through a hole in the bottom of the buggy box B, as indicated in Fig. 1, to position to be easily accessible to anyone in the buggy. The normal position of the rod or shaft I is that shown in Figs. 2 and 4 where it is held by a spring, as O, with the pin M wholly free from contact with the wheel A, but when it is desired to secure the horse so he cannot move ahead the driver pulls on the strap or chain K to draw it up so that the rod I will be moved endwise to the position shown in Fig. 3 and indicated by the dotted lines in Fig. 2, so that the pin M will pass through the wheel A, between the spokes a, so that if the horse moves forward the downward motion of the spokes, caused by the revolving motion of the wheel, will cause the pin to engage the spoke and be carried down and back with the wheel and thus draw upon the tie strap F, which is secured at one end to the horse's bits at G, and at the other end to an actuating spring roller attached to the cross bar D' that connects the thills E near the back end, or to the lower side of the thill as at N in Fig. 1; and some distance ahead of said spring a loop is secured to the thill E through which the tie strap F passes so that a bight *f* is formed by the passage of the strap from the loop *n* down through the arm L' and up to the spring N so that when the arm L is carried back there will be a direct pull upon the bits G that will prevent the horse from going forward.

To avert the danger of doing injury to the arm L or the shaft I when the horse starts to back up the pin M is pivoted to the arm L, as at *l*, so that it will be carried around with, and dropped off of the spoke *a*.

The spring O actuates the shaft I to carry it to normal position, when the strap K is released, by bearing against the inner surface of the head h', at one end and the collar or shoulder *i*, upon the shaft I, at the other end so that as soon as the strap K is released by the driver the shaft is forced back to its normal position.

Thus far the device works the same as another device for which I hold an interest in patents issued, except that I have added the securing or protecting case H, by means of which the spring O and the shaft I are fully protected from spattering mud and the device is made operative in all cases whereas with the shaft and spring exposed it was rendered absolutely inoperative where used on very muddy roads. Further, by making the arm h integral with or securely attached to the end of the case H I avert all danger of the arm,—which in my other patent stands by itself and is secured to the axletree by an insubstantial support,—from being drawn over by the effort to move the rod I endwise by drawing upward on the strap K, thus rendering the movements of the rod I always easy, positive and uniform, while with my other device the rod I, (15 in that case) is often cramped by the arm or bearing, (14 in that case) corresponding with the arm h in this invention, so that the rod cannot be moved longitudinally without great effort, which increases the danger of cramping the rod.

Having thus fully described my invention, what I claim as new and desire to secure by Letters Patent of the United States, is:—

1. In combination with the thills and axletree of a buggy, a case secured to the axletree, a rod passing through said case and bearings formed at the ends of the case to guide said rod, a spring within the case to actuate the rod, an upwardly projecting arm at one end of the rod and securely attached thereto, an upwardly projecting arm integral with and extending upward from one end of the case, a strap connected with the arm on the rod and the arm on the case and extending upward from the latter, a diagonal arm at the other end of the rod, an adjustable finger on said arm, and a strap connecting said arm with the thill and with the horse's head, substantially as and for the purpose set forth.

2. In combination with a bridle, a buggy, a buggy axletree and thill, a case secured to the axletree, an arm securely attached to the end of the case, a rod passing through the case and longitudinally adjustable therein, an arm projecting upward from the rod, a strap secured to said arm and passing through the arm on the case and upward therefrom, an arm projecting diagonally from the opposite end of the rod, an adjustable finger on said rod, an actuating spring within the case and surrounding the rod, a strap adjustably connected to the thill, passing thence to the diagonal arm, thence to the thill and to the horse's head, substantially as and for the purpose set forth.

3. In combination with a bridle, a buggy axletree, thills, wheels and box, a case secured to the axletree, a longitudinally adjustable rod in said case, an actuating spring around said rod in said case, an arm projecting from said rod, a finger on said arm adjustable to engage the wheel, means for adjusting the rod, and means for connecting the arm on the rod with the horse's head, to hold the horse by the action of the wheel on the arm, substantially as and for the purpose set forth.

Signed at Grand Rapids Michigan May 25, 1906.

WILLIAM H. GARDNER.

In presence of—
   I. J. CILLEY,
   CECIL C. CILLEY.